United States Patent [19]
Körtge

[11] Patent Number: 5,580,817
[45] Date of Patent: Dec. 3, 1996

[54] VALVE ASSEMBLY

[75] Inventor: Randolf Körtge, Usingen, Germany

[73] Assignee: Luk Fahrzeug-Hydraulik GmbH & Co. KG, Bad Homburg, Germany

[21] Appl. No.: 250,413

[22] Filed: May 27, 1994

[30] Foreign Application Priority Data

May 28, 1993 [DE] Germany .......................... 43 17 881.2

[51] Int. Cl.[6] ............................................... F04B 49/02
[52] U.S. Cl. ............................ 137/115.15; 137/115.18
[58] Field of Search .................................. 137/115, 116, 137/116.3, 115.15, 115.18

[56] References Cited

U.S. PATENT DOCUMENTS 2,496,577 2/1950 Cahill ........................................ 137/115
2,724,406 11/1955 Murray .................................. 137/115 X
2,784,729 3/1957 Schoffel ................................... 137/115
5,040,951 8/1991 Nikaido ................................... 417/310

FOREIGN PATENT DOCUMENTS 2318080 10/1974 Germany .

Primary Examiner—Stephen M. Hepperle
Attorney, Agent, or Firm—Anderson Kill & Olick P.C.

[57] ABSTRACT

A valve assembly for a discharge device, in particular a steering pump, including a flow control valve for controlling flow from the discharge device to an actuator, and a pressure-limiting valve, wherein both valves form separate components of the valve assembly and are located in one and the same cavity of the discharge device.

8 Claims, 2 Drawing Sheets

VALVE ASSEMBLY

BACKGROUND OF THE INVENTION

The present invention relates to a valve assembly for a hydraulic discharge device, in particular, a steering pump, comprising a flow control valve and a pressure-limiting valve.

In such valve assembly, the flow control valve serves for providing a predetermined fluid flow from the discharge device to an actuator. For example, when the valve assembly is used for controlling fluid flow from a steering pump to a steering gear, the fluid control valve is designed for limiting the fluid flow to the actuator to, e.g., no more than 8 l/min. The pressure-limiting valve serves for maintaining a predetermined pressure in the system, e.g., for preventing the pressure rise above 100÷110 bar.

In known valve assemblies of this type, the flow control and pressure-limiting valves are structurally connected with each other, that is, both valves are combined in a single structural piece, with the pressure-limiting valve being located in the piston of the flow-control valve. The drawback of such a structure consists in that it manufacture and assembly are very expensive.

In other known valve assemblies of this type, the flow-control valve and the pressure-limiting valve are separate elements located in different cavities formed in the discharge device housing. In this case, additional channels need be formed in the housing to connect the two valves with each other. This also results in increased production cost of the valve assembly.

Accordingly, the object of the invention is a valve assembly of the above-mentioned type which can be produced easily and inexpensively, and which would have a high functional reliability.

SUMMARY OF THE INVENTION

This, and other objects of the invention which will become apparent hereinafter, are achieved by providing a valve assembly having separate flow-control and pressure-limiting valves located in one and the same cavity of the discharge device housing, which significantly simplifies the production of the valve assembly and substantially reduces the cost of production. The simplification of production and the reduction of costs results from having a simplified structure of each valve, and in an elimination of the need to provide additional channels in the housing. At that, the both valves are directly connected with each other hydraulically, because they are located in one and the same cavity of the housing. Further, the very simplicity of the valve structures insures their high functional reliability.

According to one of the embodiments of the inventive valve assembly, the cavity, in which the two valves are located, is formed as a blind bore, with the pressure-limiting valve being at least partially located in a pocket formed in the blind bore bottom.

According to another embodiment of the inventive valve assembly, the cavity is formed as a through bore, with the pressure-limiting valve being located in a plug, which closes one end of the bore.

In preferred embodiments of the invention, the pressure-limiting valve communicates with the pressure or discharge side of the discharge device through a channel extending through the flow control valve. This permits to eliminate the need for additional channels in the housing for communicating the discharge pressure or the inlet pressure of the actuator to the pressure-limiting valve.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF PREFERRED EMBODIMENTS

Figure 1:
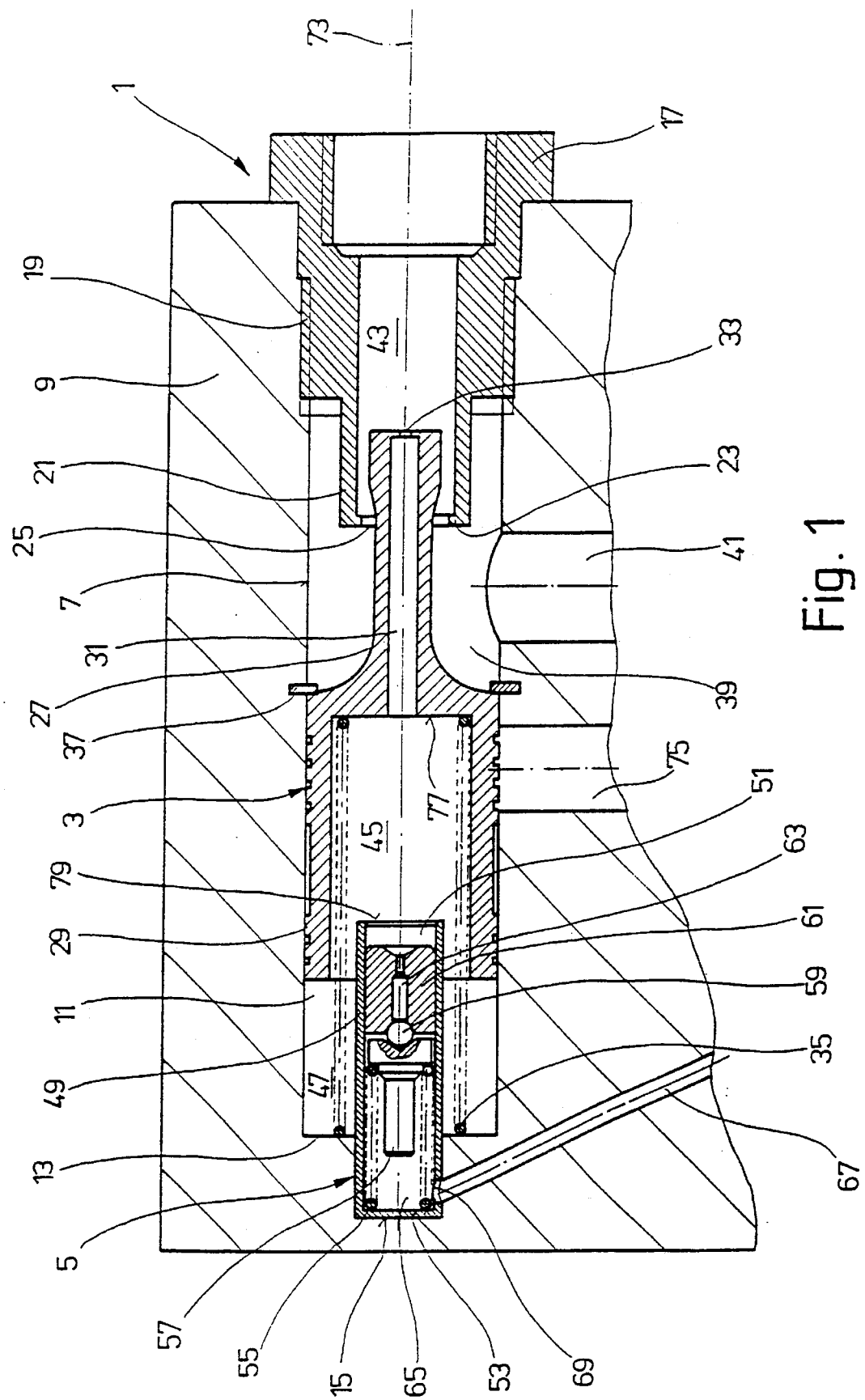
FIG. 1 is a longitudinal cross-sectional view of a first embodiment of a valve assembly according to the present invention.

The valve assembly 1, which is shown in FIG. 1, comprises a flow-control valve 3 and a pressure-limiting valve 5. Both valves 3 and 5 of the valve assembly 1 are arranged in the same cavity 7 formed in a housing 9 of a hydraulic discharge device. Below, the hydraulic discharge device will be referred to, by way of example, as a steering pump of a motor vehicle. However, it should be emphasized that the referred to valve assembly is equally suitable for use with any type of hydraulic machine, that is, any pump or motor.

In the assembly shown in FIG. 1, the cavity 7 is formed as a blind bore 11. A pocket 15 is formed in the bottom 13 of the blind bore 11. The pocket 15 is designed for receiving the pressure-limiting valve 5.

The mouth of the bore 11 is closed with a connecting plug 17 which is secured there by suitable means, e.g., a thread 19. The connection plug 17 has a projection 21 extending into the cavity 7. The projection 21 can have, for example, a cylindrical shape. An opening 25 is provided in the bottom 23 of the projection 21. A stem 27, which projects from a body of a piston 29 of the flow-control valve 3, extends through the opening 25 into the interior of the projection 21.

The stem 27 has a through channel 31, which is provided at an end thereof located in the interior of the projection 21, with an orifice 33 having a cross-section which is smaller than the cross-section of the channel 31.

The piston 29 is biased, from left to right against a stop 37, with a resilient member, e.g., a helical spring 35 in the embodiment shown in FIG. 1. The stop 37 is formed by a retaining ring located in a groove formed in the wall of the bore 11 and projecting into the bore 11. The piston 29 can be made hollow so that the spring 35 projects into the piston interior and abuts, with its opposite ends, the bottom 13 of the bore 11 and the bottom of the piston 29.

The outer diameter of the stem 27 is smaller than that of the piston 29, whereby a first pressure space 39 is formed in the bore 9. A channel 41, which is connected with a pressure space, e.g., discharge side of a hydraulic discharge device, for instance, a steering pump, has its mouth opening into the first pressure space 39.

The opening 25 connects the first pressure space 39 with an interior 43 of the connection plug 17 which communicates with an actuator of the hydraulic discharge device, in the present case, with the steering gear of a motor vehicle. The pressure oil from the steering pump can thus flow through the channel 41 into the first pressure space 39 and, therefrom, through the opening 25 and the interior 43 of the connection plug 17 to the steering gear. The pressure oil simultaneously flows through the orifice 33 and the channel 31 into an interior 45 of the hollow piston 29.

The interior 45 of the piston 29 opens into a second pressure space 47 which is formed between the piston 29 and the bottom 13 of the bore 11. Thereby, the pressure prevailing in the interior 43 of the connection plug 17 is communicated to the second pressure space 47.

The pressure-limiting valve 5 has, e.g., a cylindrical body formed as a sleeve 49 extending in the second pressure space 47. The length of the sleeve 49 is so selected that its outer opening 51 is located in the interior 45 of the piston 29. A spring, for example, a helical spring 55 which abuts at its one end the bottom 53 of the sleeve 49, biases an abutment 57 from left to right. The abutment 57 applies a pressure force to a body 59 for closing a channel 63 formed in a drain plug 61 located in the interior of the sleeve 49.

The closing body 59 can, under the action of the spring 55 sealingly engage the mouth of the channel 63 which, at the end thereof lying opposite the closing body, opens into the interior 45 and, thus, communicates with the second pressure space 47.

The abutment 57 can freely move in the interior of the sleeve 49 so that the pressure medium, which flows into the interior of sleeve 49 through the channel 63, can flow past the abutment 57. The bottom of the sleeve 49 and the drain plug 61 define together an inner space 65 into which opens a channel 67, which extends through the housing 9 and communicates, for instance, with a reservoir or a suction side of the discharge device. The inner space 65 defines a third pressure space with an orifice 69 into which the channel 67 opens.

Figure 2:
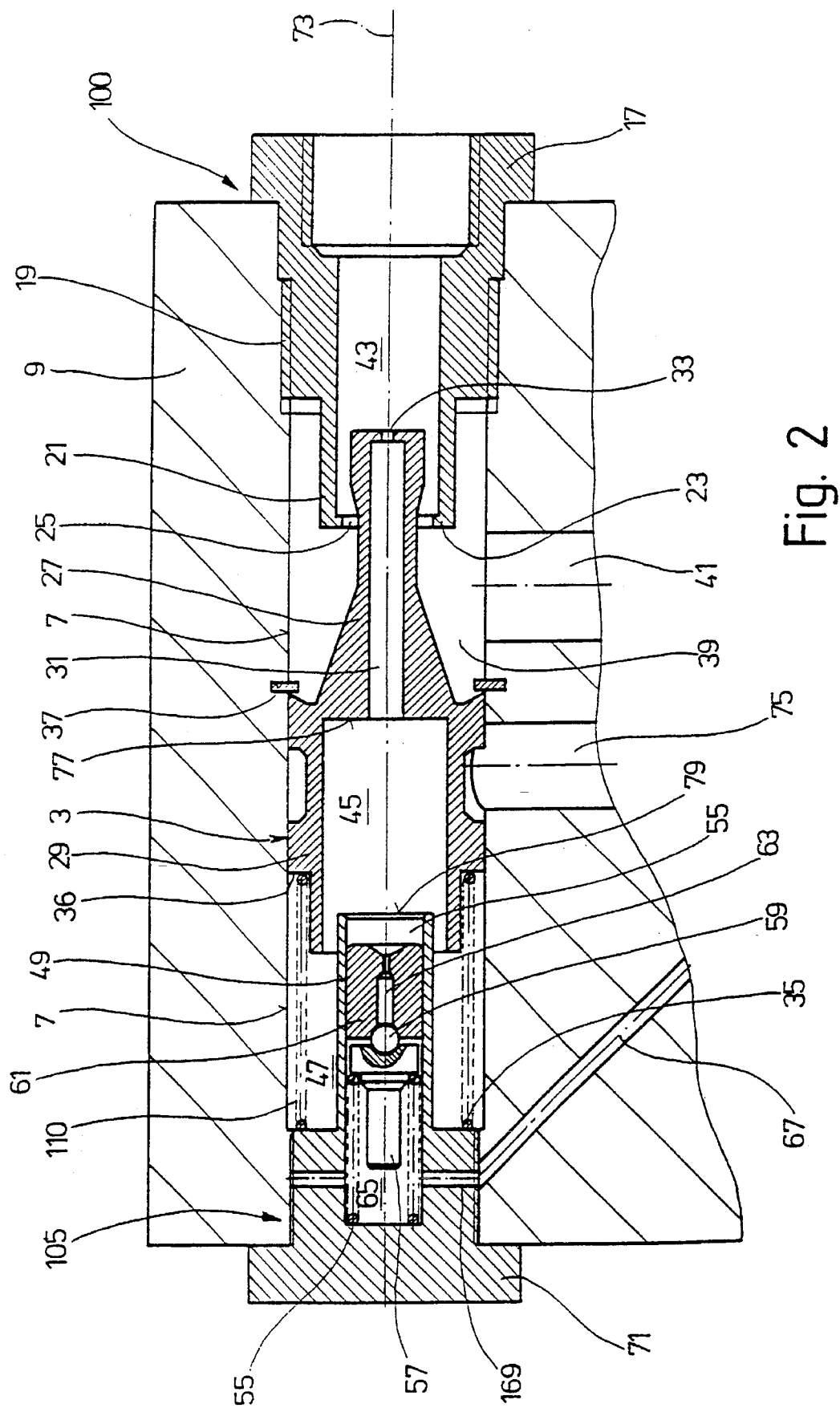
FIG. 2 is a longitudinal cross-sectional view of a second embodiment of a valve assembly according to the present invention.

The valve assembly 100 which is shown in FIG. 2, is basically similar to that shown in FIG. 1, with the elements of the valve assembly 100, identical to those of the valve assembly 1 in FIG. 1, being designated with the same reference numerals.

The pressure-limiting valve 105 only slightly differs from the pressure-limiting valve 5 of the valve assembly 1 shown in FIG. 1. The pressure-limiting valve 105 is formed as a plug which closes, from the left, the cavity 7 formed in this embodiment as a through bore 110. The right side of the bore 110 is closed with the connection plug 17, as in FIG. 1.

In the embodiment of the valve assembly 100 shown in FIG. 2, the helical spring 35 which biases the piston 29 of the flow-control valve 3 from left to right, abuts not a bottom of a blind opening as in FIG. 1, but the body of the closing plug 71. As in FIG. 1, the piston 29 is biased against the stop 37.

The constructive difference between the valve assemblies shown in FIGS. 1 and 2, consists in that the helical spring 35, which biases the piston 29 against the stop 37, is located in FIG. 2, not in the interior 45 of the piston 29 as is the case of FIG. 1, but is supported on a support shoulder of the plug 71. With regard to functioning, there are no differences between the embodiments of the inventive valve assembly shown in FIGS. 1 and 2.

The sleeve 49 forms a continuation of the base body of the pressure-limiting valve 105, and extends in the second pressure space 47 and into the interior 45 of the piston 29. The interior of the pressure-limiting valve 105 defines the third pressure space 65 which is connected with the channel 67 by a branch channel 169. The channel 67 here, as in the embodiment of FIG. 1, leads to a reservoir or a suction side of a steering pump.

The embodiments of the inventive valve assembly, shown in FIGS. 1 and 2, have the following common constructive features:

The connection plug 17, which closes the bore 11 (110), has a projection 21 extending into the first pressure space to such an extent that the channel 41, which opens into the first pressure space 39, is not blocked in any way. The diameter of the stem 27, which extends in the first pressure space 39 along the axis 73, is so selected that a sufficiently large space remains between the outer surface of the stem 27 and the inner surface of the cavity 7. This insures that the pressure oil, which flows into the first pressure space 39 through channel 41, can pass through the opening 25 without any hindrance into the interior 43 of the connection plug 17. The length of the stem 27 is so selected that it extends through the opening 25 in the rightmost position of the piston 29 of the flow-control valve 3 when the piston 29 abuts the stop 37. In its right end region, the stem 27 has a shape such that its outer diameter increases from left to right, but the largest diameter of the stem 27 in its right end region remains smaller than the diameter of the opening 25. Thus, when the piston 29 of the flow-control valve 3 is displaced, against the biasing force of the spring 35, to the left, the cross-section of the stem 27, which intersects the opening 25, increases. This results in decreasing of the free annular space between the outer surface of the stem 27 and the inner surface of the opening 25, with the displacement of the piston 29 to the left. This means that the cross-section of the free space between the outer surface of the stem 27 and the inner surface of the opening 25 is reduced upon displacement of the piston 29 of the flow-control valve 3 from the positions shown in FIGS. 1 and 2.

The stop 37 is arranged so that the piston 29, when abutting the stop 37 under the action of spring 35, does not obstruct the channel 41, and the flow through the channel 41 into the first pressure space 39 passes without any hindrance. The outer diameter of the piston 29 corresponds to the inner diameter of the cavity 7, and the outer surface of the piston 29 sealingly engages the inner surface of the cavity, and there is no fluid flow therebetween. Thus, the piston 29 acts as a sliding valve.

In the region of the housing 9 in which the outer surface of the piston 29 sealingly engages the inner surface of the cavity 7 when the piston 29 abuts the stop 37, there is provided a channel 75 leading to a suction side of a discharge device, e.g., a vane pump.

In both FIG. 1 and FIG. 2 it is shown that the piston 29 has a sealing region which is located between the channels 41 and 75. At that, the length of the sealing surface of the piston 29 is so selected that, in positions of the piston 29 shown in FIGS. 1 and 2, the channel 75 is sealed from the second pressure space 47.

Both the pressure-limiting valve 5 of FIG. 1 and the pressure-limiting valve 105 of FIG. 2 are so made that the opening 55 of the sleeve 49 is located in the region of the interior 45 of the piston 29. To this end, the sleeve 49 is provided with an outer diameter which is smaller than the inner diameter of piston 29 in the region of its interior 45, whereby the interior of the sleeve 49, both in FIG. 1 and FIG. 2, communicates with the second pressure space 47 when the sleeve 49 projects into the interior 45 of the piston 29. The sleeve 49 projects only a small distance into the interior 45, so that the piston 29 can be displaced to the left against the biasing force of the spring 35, without the bottom 77 of the piston 29 engaging the end surface 79 of the sleeve 49.

As soon as the piston 29 is displaced against the biasing force of the spring 35 a predetermined amount, the sealing region of the piston 29 unblocks the channel 75 whereby fluid communication is established between the channels 41 and 75.

In both embodiments of the inventive valve assembly, the pressure, prevailing in the second pressure space 47, acts on the closing body 59 through the channel 63 formed in the closing plug 61. When the pressure in the second pressure space 47 and thus, in the interior 45 of the piston 29 increases to an extent that it exceeds the biasing force of the spring 55, which biases the abutment 57 and the closing body 59 against the mouth of the channel 63, the channel 63 opens, and the oil flows from the second pressure space 47 through the channel 63 past the abutment 57 into the third pressure space 65. From the third pressure space 65, the oil flows through the branch channel 169 into the channel 67 and then into the reservoir or to the suction side of the discharge device.

Functionally, the described valve assembly operates as a conventional valve assembly. The flow control valve serves for limiting the fluid flow to the actuator, here, to the steering gear, to, for example, 8 l/min, when the pressure in the channel 41 and, thus, in the first pressure space 39 increases. The pressure increases when the rotational speed of the internal combustion engine which drives the hydraulic discharge device, the steering pump, increases, whereby the fluid flow from the driven pump also increases.

The increase of the rotational speed of the internal combustion engine takes place when a steering force, applied to the steering wheel, increases. The increased pressure in the first pressure space 39 leads to the displacement of the piston 29 to the left, against the biasing force of the spring 35, from its initial position shown in FIGS. 1 and 2. This results in the displacement of the sealing surface of the piston 29 to the left, which provides for fluid communication between the first pressure space 39 and the channel 75.

The displacement of the piston 29 to the left also results in the reduction of the free cross-section of the opening 25 because the cross-section of the stem 27, which intersects the opening 25, increases. Thereby, with increase of pressure in the first pressure space 39, the channel through which oil flows into the interior 43 of the connection plug 17 narrows, and the fluid flow changes from, for instance, about 8 l/min to 4 l/min. Thus, the increase in pressure leads to an increase feel of the steering.

The pressure in the interior 43 of the connection plug 17 is transmitted through the orifice 33 and the channel 31 in the stem 27 to the second pressure chamber 47. When the pressure in the second pressure chamber exceeds a predetermined amount, e.g., 100÷110 bar, the closing body, under the pressure, moves against the biasing force of the spring 55, unblocking the channel 63, and a fluid communication establishes between the second and third pressure spaces and, thus, between the areas of high and low pressures, the low pressure area being the reservoir or the suction side of the discharge device, for example, steering pump.

This communication leads to the reduction of the pressure acting on the piston 29 and the piston 29, when the pressure increases further in the system, in particular in the actuator, here, the steering gear, moves to the left. Further movement of the piston 29 to the left results in the increase of an open area of the channel 75, so that more oil can flow from the first pressure space 39 into the channel 75. However, the reduction of the free area of the opening 25 leads to reduced flow into the interior 43 and thereby, to the reduction of flow from the interior 43 of the connecting plug 17 into the second pressure space 47. This, together with actuation of the pressure-limiting valve 5 (105) leads to pressure equilibrium in the first and second pressure spaces, and the position of the piston 29 is thereby stabilized. If the pressure in the system increases further, the piston 29 is displaced further to the left, and more oil flows into the channel 75 which limits any further increase in the system pressure.

Because the pressure-limiting valve 5 or 105 which effects pressure control, communicates with the interior 43 of the connection plug 17 and, thus, with the actuator, through the piston 29, the channel 31 in the stem 27, the pressure, supplied by the discharge device, can be controlled in an optimal manner without a need to provide additional channels in the housing 9 of the discharge device. In this way, a direct pressure connection with the pressure-limiting valve is realized in a simple and economical manner, with the valves 5 (105) and 3 being very compact.

The piston 29 of the flow-control valve 3 is acted upon, at one side thereof, with a first pressure corresponding to the pressure in the first pressure space 39, and at the other side thereof, with a second lower pressure corresponding to the pressure in a second pressure space 47, that is, with pressure prevailing in the interior 45 of the piston 29, with the pressure in the second pressure space 47 able to increase, if needed.

The increased pressure in the second pressure space 47 can directly act on the pressure-limiting valve 5 (105), without a need to provide in the housing 9 additional high-pressure channels. Through the pressure-limiting valve, a communication with a third pressure, which is reduced in comparison with the second pressure, can be established, e.g., with the reservoir or the suction side of the discharge device.

The valve assembly can be produced in a simple and very economical way. By the separation of two components of the valve assembly 1 or 100, there is provided a simple basic structure and, at the same time, a functional reliability is insured with the valve assembly requiring little space.

It is especially advantageous that, by separating the pressure-limiting and flow control valves, a very simple structure of the flow control valve can be achieved. On the other hand, the separation of the pressure-limiting and flow control valves, with the both valves being located in the same cavity of the discharge device housing, permits to provide a simple structure of the valve assembly and of the discharge device, in which the valve assembly is used. From the manufacturing point of view, it is of no importance whether the pressure-limiting valve is located in the pocket of a blind bore, as in the embodiment of Fig. 1, or is located in a closing plug 71 which closes an end of a through bore, as in the embodiment of FIG. 2.

While the present invention was shown and described with reference to the preferred embodiments, various modifications thereof will be apparent to those skilled in the art, and it is not intended that the invention be limited to the disclosed embodiments or details thereof, and departures may be made therefrom within the spirit and scope of the appended claims.

What is claimed is:

1. A valve assembly for a hydraulic discharge device having a housing and a cavity formed in the housing, comprising:

a flow control valve located in the cavity of the discharge device housing for controlling fluid from the discharge device to an actuator, said flow control valve including a hollow piston; and a pressure-limiting valve located in the cavity of the discharge device housing and extending at least partially into an interior of said hollow piston;

wherein both said flow control valve and said pressure-limiting valve are in direct fluid communication with a common pressure space formed in the discharge device housing;

wherein said valve assembly further comprises a first pressure space which communicates with a discharge side of the discharge device, and from which fluid is delivered to the actuator, and a channel communicating with a suction side of the discharge device;

wherein said flow control valve controls fluid flow from said first pressure space to the actuator, said hollow piston is displaceable upon increase of pressure in said first pressure space to establish a variable fluid communication between said first pressure space and said channel; and wherein said pressure-limiting valve is actuated upon increase of fluid pressure at an inlet of the actuator above a predetermined amount.

2. A valve assembly as set forth in claim 1, wherein the cavity is formed as a blind bore, and wherein said pressure-limiting valve is located in a bottom of the blind bore, and the flow control valve is spaced from the bottom.

3. A valve assembly as set forth in claim 1, wherein the cavity is a through bore formed in the housing of the discharge device, and wherein said valve assembly comprises a plug for closing one side of the through bore, said pressure-limiting valve being located in said closing plug.

4. A valve assembly as set forth in claim 1, wherein said flow control valve includes a through channel which connects said pressure-limiting valve with an inlet side of the actuator and with said first pressure space.

5. A valve assembly as set forth in claim 4, wherein said through channel has a restriction orifice of a predetermined diameter.

6. A valve assembly as set forth in claim 1, wherein said flow control valve piston which is subjected to a discharge pressure of the discharge device and to an inlet pressure of the actuator.

7. A valve assembly as set forth in claim 4, wherein said hollow piston is displaceable in the cavity of the discharge device housing against a spring biasing force and has a first side subjected to a first pressure, which prevails in said first pressure space, and a second side subjected to a second pressure lower than the first pressure and which prevails in a second pressure space, which is adjacent to said second side and is defined by said common pressure space.

8. A valve assembly asset forth in claim 7, wherein said valve assembly comprises means for communicating the second pressure to said pressure-limiting valve, and a third pressure space in which a third pressure, lower than the second pressure, prevails, said pressure-limiting valve communicating said second pressure space with said third pressure spaces when the second pressure exceeds a predetermined value.

* * * * *